Figures 1, 2:
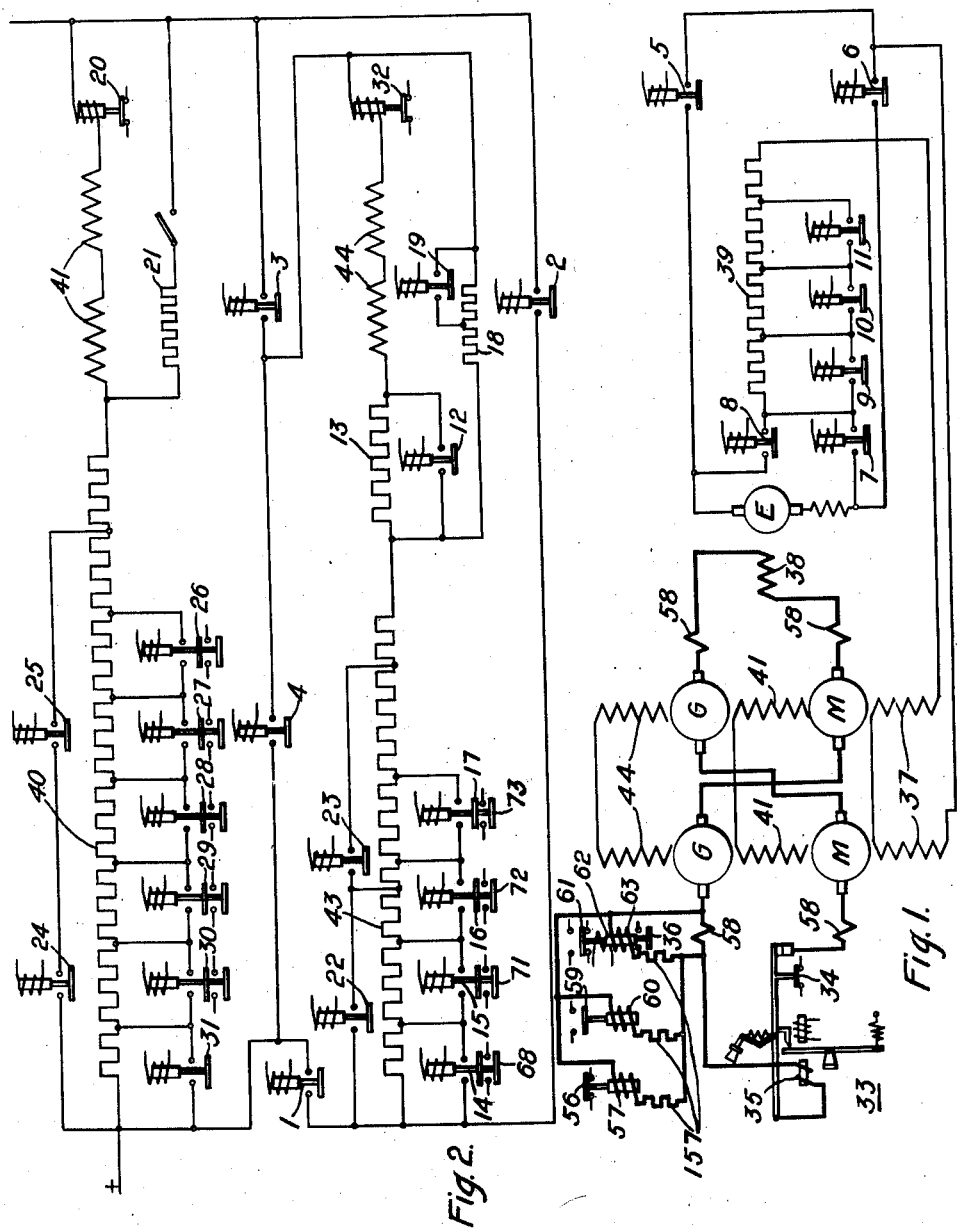

E. S. LAMMERS, Jr.
CONTROL SYSTEM.
APPLICATION FILED MAR. 8, 1919.

1,411,040.

Patented Mar. 28, 1922.
2 SHEETS—SHEET 1.

WITNESSES:
H. J. Shelhamer
David Rines

INVENTOR
Edwin S. Lammers, Jr.
BY
Wesley G. Carr
ATTORNEY

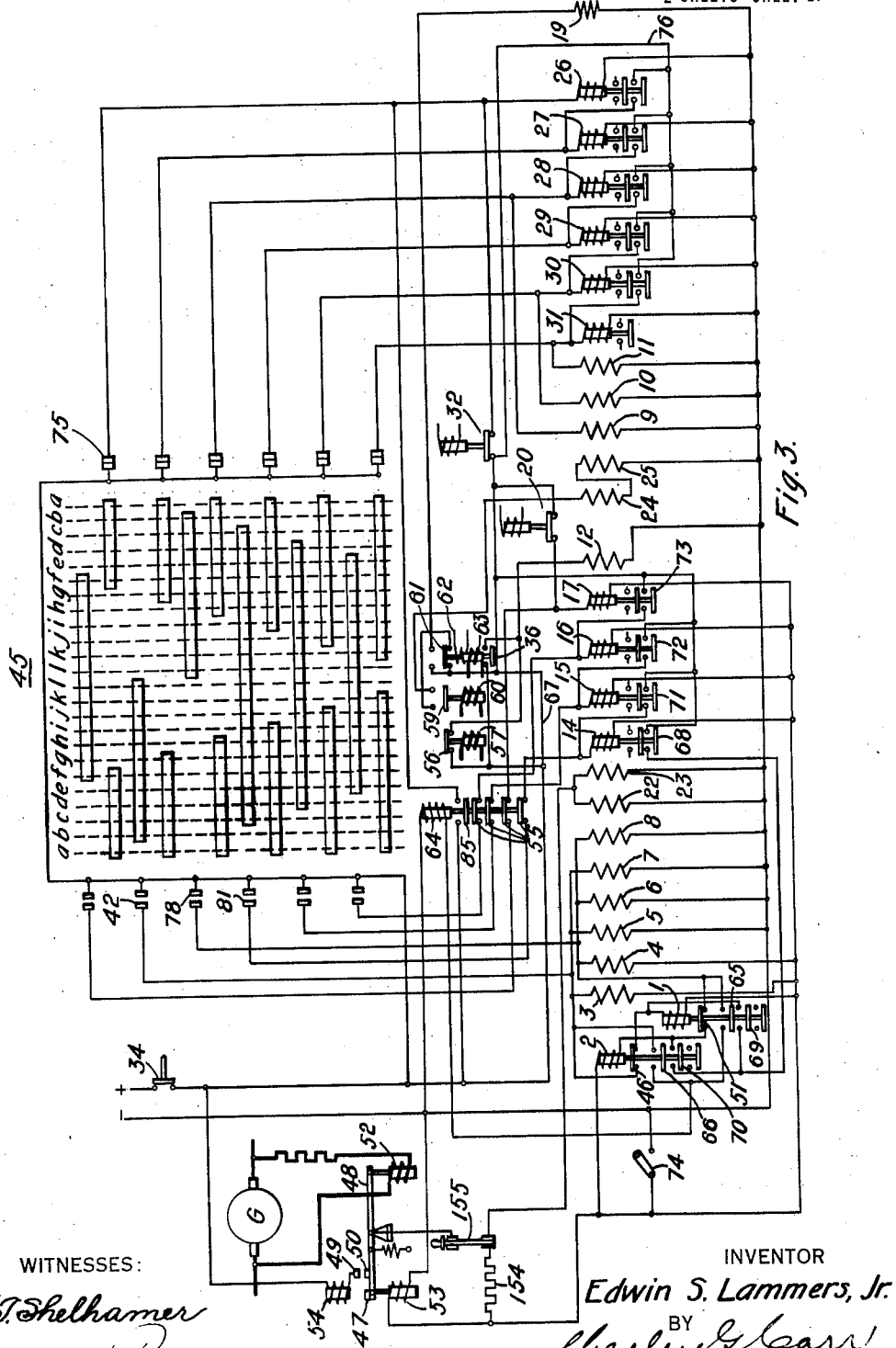

UNITED STATES PATENT OFFICE.

EDWIN S. LAMMERS, JR., OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,411,040.  Specification of Letters Patent.  Patented Mar. 28, 1922.

Application filed March 8, 1919. Serial No. 281,525.

*To all whom it may concern:*

Be it known that I, EDWIN S. LAMMERS, Jr., a citizen of the United States, and a resident of Wilkinsburg, in the county of Allegheny and State of Pennsylvania, have invented a new and useful Improvement in Control Systems, of which the following is a specification.

My invention relates to control systems for dynamo-electric machines and particularly to systems for controlling electric motors, the direction of operation and the speed of which are controlled by varying the polarity and the excitation of separately excited field-magnet windings of electric generators in circuit with the motors.

The excitation of the field-magnet windings is governed by resistors which are adapted to be short-circuited for accelerating purposes. If the current traversing the generator armature exceeds a predetermined value, resistance is reinserted into the circuit of the field-magnet winding to weaken the excitation thereof until the current falls again below this value.

A permanent discharge resistor is commonly employed in parallel relation to the field-magnet winding for a well-known purpose. The rate of change of the current traversing this winding depends on the ohmic value of the discharge resistor, this rate increasing the more rapidly, the higher the ohmic value. As, therefore, the accelerating resistor and the resistor which is employed for the purpose of weakening the field (these two resistors sometimes being the same) upon an abnormal rise of current in the armature circuit are connected in series with the discharge resistor and the field-magnet winding in parallel, the field excitation does not respond readily to weakening changes when the discharge resistor is of high ohmic value. This failure to respond readily is particularly objectionable in the case of "field-forcing" systems in which, in order to save time, the generator field is temporarily over-excited in order to more quickly build up the field strength to the desired value.

An object of my invention is to provide a control system of the above-designated character, the field excitation of which shall respond more readily to changes in the field-weakening resistor.

A second object of my invention is to provide such a system with the use of which a too rapid weakening of the generator field will be prevented.

A third object of my invention is to provide such a system with which it is possible to effect the acceleration of the dynamo-electric machine, either with or without the employment of "field forcing".

A method commonly employed for rendering the field-weakening resistor responsive to changes in the current conditions of the dynamo-electric machine is to place it under the control of a switch which is closed and opened by a relay having an actuating coil responsive to the said current conditions. The coil is ordinarily connected across the terminals of an additional resistor or a reactive shunt, or both, in series or in parallel with the coils of additional relays which control other mechanisms in accordance with current conditions. The additional resistors and reactive shunts complicate the apparatus and contribute to its expense.

A fourth object of my invention is to provide a control system which shall not require this additional apparatus.

My invention finds special application in connection with systems comprising generators and motors, the armatures of which are connected in series and the field-magnet windings of which are separately excited. Often the fields of both the generators and the motors are controlled by resistors, as is described in an application for a control system, Serial No. 97,800, filed May 16, 1916, by Lum, patented Feb. 1, 1921, No. 1,367,155, and assigned to the same assignee as this application, the generator resistor being first short-circuited to increase the voltage of the generator and thereby effect the acceleration of the motor, and the motor field resistor being then inserted into circuit to further accelerate the motor. It is essential that this sequence of control be maintained during acceleration and the corresponding sequence, in the reverse order, during deceleration.

A fifth object of my invention is to provide a control system for a motor and a generator with the use of which the above-mentioned sequence of operations will be assured.

A sixth object of my invention is to provide such a system with the use of which the above-mentioned sequence of operations shall be controlled in accordance with predetermined electrical conditions.

A seventh object of my invention is to provide such a system, with the use of which the controller handle may be quickly moved from the extreme running position, corresponding to the forward operation of the motor, to the extreme running position, corresponding to the reverse operation of the motor, or vice versa, or to any intermediate position, without danger of the current reaching an excessive value during reversal and without interfering with the above-mentioned sequence of operations.

An eighth object of my invention is to insure the opening of all the control circuits upon the current traversing the main circuit exceeding a predetermined value.

Other objects of my invention will appear hereinafter.

According to my invention, the field-weakening resistor is separate and distinct from the accelerating resistor and is included in the local circuit comprising the field-magnet winding and the discharge resistor, but in series relation to both the accelerating resistor and the field-magnet winding. Its effect upon the field-magnet winding is thus rendered much more rapid than is the case with the systems of the prior art, because the ohmic value of the local discharge-resistor circuit is thereby increased when the field-weakening resistor is reinserted into circuit. I provide also for short-circuiting an adjustable portion of the field-discharge resistor to prevent a too rapid weakening of the generator field during deceleration. The current-responsive coils for the relays referred to above are connected across the terminals of the commutating or the compensating windings, or both, a connection which dispenses with the use of additional resistors and reactors.

A pair of relays are provided, each with a coil in circuit with one of the field-magnet windings for controlling the resistor which is in series with the other field-magnet winding. In order to insure timely response of these coils to current conditions, they are inserted in series with the field-weakening resistors and the field-magnet windings and in a local circuit comprising the discharge resistors. The nature of the control exercised by the relays is such that the generator and the motor must accelerate in the order named and decelerate in the reverse order, with provision for a time-interval between the acceleration and the deceleration of the two machines, variable in length in accordance with the current conditions favorable for safe operation. The accelerating switches for both machines are interlocked to insure their operation in proper sequence. A relay is provided for insuring the proper sequential operation of the accelerating and the directional switches independently of the position of the master controller so that this controller may safely be quickly actuated from one extreme running position, corresponding to either forward or reverse operation, to the opposite extreme running position, or to any intermediate position. A circuit-breaker in series with the armatures of the generators and the motors is adapted to simultaneously open all the control circuits so as to prevent possible injury to the machines.

In the accompanying drawings, Figure 1 is a diagrammatic view of the main circuits of two generators and two motors connected in a closed circuit, and an exciter generator for supplying current to a part of the motor-field-magnet windings. Fig. 2 is a diagrammatic view of the circuits of the field-magnet windings of the motors and the generators, together with the controlling switches therefor. Fig. 3 is a diagrammatic view of the circuits for controlling the various switches illustrated in Figs. 1 and 2.

Two generators G and two motors M are connected in series in a closed circuit, the generators and the motors being alternately disposed in the circuit. The field excitation and the polarity of the generators and the field excitation of the motors is controlled by electromagnetic switches. An exciter E, which supplies current to motor field-magnet windings 37, is provided with a field-magnet winding 38 that is in series with the generators G and the motors M. My invention is not restricted to the particular arrangement of generators, motors and exciters herein illustrated but is equally applicable to systems comprising, for example, a single generator and a single motor, the armatures of which are connected in circuit, and parts of my invention are applicable to the control of a single generator or a single motor.

A resistor 39, that is in series with the motor-field-magnet windings 37, is controlled by electromagnetic switches 9, 10 and 11. A resistor 40, that is in series with the motor-field-magnet windings 41 is controlled by electromagnetic switches 24 and 25, which are caused to operate in the manner of fluttering relays, under conditions to be later described, and by electromagnetic switches 26 to 31, inclusive. The motor-field-magnet windings 41 are arranged to be energized by any suitable source of constant voltage. In the illustrated embodiment of the invention, the field-magnet windings 37 and 41 are shown as separately excited. The voltage applied to the motor-field-magnet windings 37 is variable, since the voltage of the exciter E varies in accordance with the current traversing the main circuit.

A resistor 43, which is connected in series with the generator field-magnet windings 44, is controlled by electromagnetic switches 14 to 17, inclusive, and electromagnetic switches 22 and 23 which may be termed generator "field-forcing" switches. The direction of current traversing the generator-field-magnet windings 44 is controlled by electromagnetic switches 1, 2, 3 and 4. The connections of the motor-field-magnet windings 37 to the terminals of the exciter E are similarly controlled by reversing switches 5, 6, 7 and 8.

A field-weakening resistor 13 is inserted in series with the field-magnet windings 44 and in a local circuit comprising the discharge resistor 18 for these windings. A portion of this discharge resistor 18 is adapted to be short-circuited by an electromagnet switch 19, during deceleration, for a purpose to be described later. This portion may be adjustable, as desired. A relay 20 is connected in series with the field-magnet windings 41 and in a local circuit comprising the discharge resistor 21 for these windings, and a similar relay 32 is connected in series with the field-magnet windings 44 and in a local circuit comprising the discharge resistor 18. The relays 20 and 32 respectively control the excitation of the field-magnet windings 44 and 41, as will be described.

The circuit of the generator and motor armatures may be closed by a circuit-breaker 33 having a switch 34 mechanically connected thereto, which is adapted to close the control circuits of the system. The circuit-breaker is adapted to be automatically opened by a coil 35, which is in series with the motor and the generator armatures when the current traversing the circuit of these armatures exceeds a predetermined value. The opening of the circuit-breaker effects the opening also of the control circuits through the mechanically connected switch 34. A plurality of relays 56, 59 and 61 are provided with actuating coils 57, 60 and 63, respectively, which coils are connected, in series with calibrating resistors 157, across the terminals of the compensating or commutating field-magnet windings 58, or both, of one or more of the generators and motors. The relay 61 is provided also with a shunt coil 62, which is wound oppositely to the coil 63 so as to oppose the operation of the coil 63 during acceleration and to assist the said coil during deceleration.

The control circuits are diagrammatically illustrated in Fig. 3. For convenience, the actuating coils have been designated by the same reference numerals that are applied to the corresponding switches. In some cases, for simplicity's sake, the coils alone have been illustrated, the switches being omitted. A controller 45, which is illustrated as of the cam type, but which may be of the drum type, effects the closing of the several switches in the required sequence. The segments of the controller 45 effect the closing of switches, a few of which are numbered 42, 75, 78 and 81.

A relay 47 comprises a pivotally-mounted arm 48 for effecting the engagement and the disengagement of contact members 49 and 50. The relay 47 is provided with two actuating coils 52 and 53, which tend to actuate the lever 48 in opposite directions. The coil 52 is connected across terminals of one of the generators G and is, therefore, responsive to generator voltage. The coil 53 is connected in series with the actuating coils of the switches 1 to 4 and 14 to 17, inclusive. These actuating coils are connected in parallel relation and the coil 53, therefore, is energized to a degree corresponding to the number of actuating coils that are connected in circuit by the controller 45. By means of this arrangement, the resistance of the circuit comprising the coil 53 varies in accordance with the position of the controller and the number of electromagnetic switches operating to close the circuit of the field-magnet windings 44 and to short-circuit sections of the resistor 43.

The relation of the coils 52 and 53 and the actuating coils in series with the relay coil 53 are such that the ampere turns of the coils 52 and 53 are equal when the generator voltage reaches a value corresponding to the position of the controller 45, and the contacts 49 and 50 are opened. The relay switch 47 is provided also with an auxiliary, stationary magnet coil 54 that is in series with the contact members 49 and 50. The function of the coil 54, which exerts a comparatively slight pull, is to insure that the contact members 49 and 50 shall be positively separated, upon the opening of the relay. This action prevents continual sparking at the contact members which would otherwise occur when the coils 52 and 53 are energized to a substantially equal degree.

A resistor 154 has much the same effect as the coil 54 and may be employed as a substitute therefor. Upon the closing of the contact members 49 and 50, a circuit is established from the positive line conductor, through the switch 34, the coil 54, the resistor 154 and the coil 53, to the negative line conductor. Upon the opening of the contact members 49 and 50, this circuit becomes opened, the energy of the circuit is rendered negligible and a quick opening is effected. A switch 155 is adapted to open the circuit.

The relay 47 controls the circuits of the actuating coils of the switches 22 and 23. The latter switches control a shunt circuit for the major portion of the resistor 43 and thus operate to materially increase the electromotive force applied to the generator field-magnet windings 44 when the relay switch 47 is closed by reason of the unbalanced pulls of the coils 52 and 53. More briefly stated, the function of the switches 22 and 23 is to force the generator fields. The switch 12 (in practice two switches are employed, like the switches 22 and 23) is controlled by the relay 56 in its unactuated position. The switches 24 and 25, which control a short-circuit for the major portion of the resistor 40, are controlled by the relay 59 when this relay occupies its actuated position, during acceleration. The effect of the operation of the relay 59 depends upon the relay 61 occupying its normal position. During deceleration, the relay 61 is actuated to the upper of its two positions, thereby to control the switch 19. A switch 36 may be mechanically connected to the relay 61 for the purpose of shunting the relay 56 so as to maintain the switch 12 closed during deceleration, irrespective of the position of the relay 56.

The actuating coils of the switches 14, 15, 16 and 17 are each controlled by one of a plurality of switches 55 mechanically connected together and adapted to be actuated simultaneously by a coil 64, the circuit of which is controlled through switches 65 and 66, which are mechanically interlocked to the switches 1 and 2 in such fashion that the coil 64 may be energized only when one of the switches 1 and 2 is closed and the other open, and the controller 45 occupies a position such as to cause the closing of that one of the switches 1 and 2 which is open. By means of this arrangement, it is possible to actuate the controller 45 from any forward or reverse position to any other position without danger of undesirable operation of the switches 14 to 17. A switch 85 is also mechanically connected to the switches 55, this switch being normally open and the switches 55 being normally closed.

In practice, the generators G are mechanically driven by large induction motors, the speed of which is automatically regulated in accordance with the current taken by, and the load upon, the motors M. When the controller 45 initially occupies its illustrated, inoperative position $a$, the voltage of the generators is substantially zero since the field-magnet windings 44 are not energized. The motor field-magnet windings 41 are energized, since they are connected between the terminals of a constant-potential source. The motor-field-magnet windings 47 are deenergized because their circuits are open at the reversing switches 5, 6, 7 and 8. In the position $a$ of the controller 45, the switches 9, 10, 11 and 26 to 31, inclusive, are closed to complete shunt circuits for the major portion of the resistors 39 and 40 and thus to insure a relatively strong field for the motors M upon the operation of the reversing switches 5 and 7 or 6 and 8, as the case may be, and in order that the field-magnet windings 41 may be traversed by a current of relatively high value when the circuits are established.

Assuming that the controller 45 is actuated to the left to the position $b$, the switch 42 will be closed to establish a circuit which extends from the positive line conductor through the mechanically connected switch 34, the switch 42 and the coils of the switches 1, 3, 5 and 7 in parallel, to the negative line conductor. The circuits of the coils of the switches 5 and 7 lead to the negative line conductor directly, but the coils 1 and 3 are connected to the negative line conductor through the coil 53. Switches 3 and 4 are, like the switches 1 and 2, provided with a number of mechanically interlocked switches, the interlocked switches being shown on the switches 1 and 2 only for the purpose of simplifying the drawing. The coil of the switch 1 is connected to the switch 42 through a switch 46 that is mechanically connected to the switch 2, and the coil of the switch 2 is similarly connected through a switch 51 that is mechanically connected to the switch 1, so as to prevent the energization of one of the coils of the switches 1 and 2 until the switch controlled by the other coil occupies its inoperative position.

The energization of the coils of the reversing switches 1 and 3 effects the closing of these switches to complete the circuit of the generator-field-magnet windings 44 through the resistors 43 and 13 and the actuating coil of the switch 32. The reversing switches 5 and 7 are also closed in the first position of the controller to connect the field-magnet windings 37 and a portion of the resistor 39 (not controlled by the switches 9, 10 and 11) in circuit with the armature windings of the exciter E.

In position $c$ of the controller, a circuit is completed through a switch 81, which is closed when the controller 45 occupies the position $c$, a switch 55, the actuating coil of the switch 14 and the coil 53, to the negative line conductor. The switch 14 operates to shunt a section of the resistor 43 and thus increases the field excitation of the generators. The shunting of a section of the resistor 43 by the switch 14 causes the voltage of the generators G to assume a corresponding value, but an appreciable interval of time is required for the voltage to reach the value corresponding to the adjustment of the controller after the switch 14 has operated.

The resistance of the circuit comprising the coil 53 is decreased upon the connection of the actuating coil of the switch 14 in parallel relation to the actuating coils of the switches 1 and 3. A correspondingly strong pull is exerted by the coil 53 to effect the engagement of the contact members 49 and 50. The contact members are closed, therefore, to complete a circuit for the actuating coils of the switches 22 and 23 and the latter operate to complete a short-circuit for a comparatively large portion of the resistor 43 to temporarily permit the generator-field-magnet windings 44 to be subjected to abnormally heavy voltage values, whereby the rate of change of the current traversing the windings 44 is increased and the current is built up to the desired value in a shorter period of time.

This field-forcing operation has some points in common with the operation of the system of the above-mentioned Lum application. It will be noted, however, that, according to my system, an additional field-forcing step is obtained when the controller 45 occupies the position b to cause the energization of the coils 1 and 3 because, like the coils of the actuating coils of the switches 14 to 17, they are connected in series with the coil 53. In practice, furthermore, the actuating coils of the switches 22 and 23 are continually energized through resistors which are short-circuited to increase the energization of these coils when it is desired that the switches operate.

As soon as the generator voltage reaches a value, corresponding to the position of the controller, the coil 52 is energized to exert a pull substantially equal to that of the coil 53, and the relay operates to effect the opening of the switches 22 and 23. The generator windings are now supplied with current at normal value, and the generator voltage remains substantially constant. In the same manner, the actuation of the controller to its succeeding positions d, e and f operates to effect the closing of the switches 15, 16 and 17 to increase the voltage of the generators and thereby accelerate the motors.

The switches 22 and 23 are adapted to control not only the portion of the resistor 43 that is under the control of the switches 14 to 17, inclusive, but also about one half of the permanent resistor. In this manner, field forcing is always obtainable, even when the last switch 17 closes.

In the same manner, the switches 24 and 25 may control not only the portion of the resistor 40, but about one half of the permanent resistor as well, thereby providing for forcing the fields of the motors M during deceleration. This forcing effect may be in addition to, that of the relay 59 or as a substitution therefor.

It will be understood that the operation of the controller may be step-by-step, or it may be actuated quickly to any of its actuating positions, whereupon the several switches will operate automatically and in sequence. If the controller be actuated quickly to any desired operating position, the coil 52 will not operate until all of the switches 14 to 17, inclusive, which are controlled in accordance with the actuated position of the controller 45, have closed and the voltage of the generator has built up to the value corresponding to the position of the master controller.

The completion of the circuits for the respective actuating coils of the switches 14 to 17, inclusive, further decreases the resistance of the circuit comprising the relay coil 53, and the latter is energized by an increasingly heavy current corresponding to the adjustment of the controller. The relay remains closed, therefore, until the coil 52 is energized at correspondingly higher values.

The closing of the switch 14 establishes a holding circuit for the actuating coils of the switches 1 and 3. This holding circuit has been illustrated for the coil of the switch 1 only and extends from the positive line conductor, through the mechanically connected switch 34, a conductor 67, a switch 68 mechanically connected to the switch 14 and which is closed simultaneously therewith, a switch 69 which is mechanically connected to the switch 1, the actuating coil of the switch 1 and the coil 53, to the negative line conductor. A similar holding circuit for the coils 2 and 4 may be established, during the reverse operation of the generators, the holding circuit for the coil of the switch 2 being established through a switch 70 mechanically connected to the switch 2. These holding circuits insure the opening of the switch 14 before that of the reversing switches.

In similar fashion, holding circuits are established for each of the actuating coils of the switches 14, 15 and 16 upon the closing of the switches 15, 16 and 17, respectively, through switches 71, 72 and 73, respectively, mechanically connected to the switches 15, 16 and 17. A holding circuit for the actuating coil of the switch 17 is controlled by the relay 20, the actuating coil of which is in circuit with the field-magnet windings 41. This holding circuit extends from the positive line conductor, through the mechanically connected switch 34, by the conductor 67 through the relay 20, the actuating coil of the switch 17 and the coil 53, to the negative line conductor.

I have shown an open switch at 74 in parallel relation to the coil 53 and in series with coils 1 to 4 and 14 to 17, inclusive. By closing this switch 74, the circuits of the coils of the switches 1 to 4 and 14 to 17, inclusive, may be established directly to the negative line conductor, in which event the coil 53 will not be energized and the actuating coils of the switches 22 and 23 will remain de-energized throughout the accelerating operation. Provision is thus made, through the mere closing of a single switch, for dispensing with field forcing, if it is desired to accelerate in the ordinary manner.

When the controller 45 occupies the position $g$, a switch 75 is opened to cause the deenergization of the actuating coil of the switch 26 which switch opens to insert a section of the resistor 40 in series with the field-magnet windings 41 to further accelerate the motor. The circuits of the coils of the switches 27 to 31 are similarly opened when the controller 45 occupies successively the positions $h$, $i$ $j$, $k$ and $l$, respectively. Each of the switches 26 to 30 is provided with a switch mechanically interlocked therewith for controlling the circuit of the actuating coil of the next succeeding switch to operate, so that the switches 26 to 31 must open in the sequence indicated by the numbers signifying their reference numerals, irrespective of the position of the controller 45. The maintaining circuits for the coils of the switches 27 to 31 are connected in parallel relation to the positive line conductor, by way of a conductor 76. A maintaining circuit for the actuating coil of the switch 26 is controlled by the relay 32, which is connected to the positive line conductor. The gradual insertion of the resistor 40, due to the successive opening of the switches 26 to 31 causes a further weakening of the fields of the motors. The switches 9, 10 and 11 also open, in the order named, when the controller 45 occupies the positions $i$, $k$ and $l$, respectively. The motors now operate at their normal operating speeds, with the generator voltage at a normal value and the fields of the motors weakened to a normal degree.

If, during the process of acceleration of the generators, the current traversing the main circuit exceeds a predetermined value, the relay 56 will operate to open the circuit of the actuating coil of the switch 12 and the latter will open to temporarily insert the field-weakening resistor 13 into circuit, the excitation of the field-magnet windings 44 is thereby weakened and the operation of the generators is controlled to a corresponding extent. Owing to the fact that the resistor 13 is in series with the field-magnet windings 44, and in parallel to the discharge resistor 18, the effect of the insertion of the resistor 13 upon the excitation of the field-magnet windings 44 is much more rapid than it would be if the resistor 18, as is the case in systems of the prior art, were connected directly across the terminals of the windings 44. The reason for this is that, when the discharge resistance is of high ohmic value, this rate is small. By connecting the resistor 13 in the manner described, the effect is to increase the ohmic value of the discharge resistance and thereby, also, the rate of change of the current traversing the field-magnet winding.

The relay 59 is also adapted to operate when the current traversing the main circuit exceeds a predetermined value. The operation of this relay serves to close a circuit extending from the positive line conductor, through the mechanically connected switch 34, by the conductor 67, through the relays 61 and 59 and the coils 24 and 25 (which may be connected either in series or in parallel, as desired), to the negative line conductor. The closing of this circuit causes the energization of the actuating coils of the switches 24 and 25, which switches are caused to close to complete temporarily a short-circuit for the variable portion of the resistor 40 and thus to strengthen the fields of the motor. As the relay 59, like the relay 56, operates in the manner of a fluttering relay during such time as the current values in the main circuit exceed a predetermined value, the current traversing the main circuit is automatically maintained within predetermined limits.

The switches 14 to 17 may close, and the switches 26 to 31 open, simultaneously during acceleration, as they are under the direct control of the controller 45. The closing of the last-named switches and the opening of the first-named switches for decelerating purposes, however, must be effected according to a predetermined sequence because of the manner in which the actuating coils of the various switches are controlled by switches mechanically connected to the preceding or succeeding switches. The switch 17 must open before the switch 16 and the latter before the switch 15, and so on. Similarly, the switch 26 must close before the switch 27, the latter before the switch 28 and so on. Not only is the sequence of operation of these switches thus determined, but a time interval between the operation of the generator switches and the motor switches is provided for by the relays 20 and 32. This time interval is variable, depending upon the excitation of the field-magnet windings 41 and 44. Thus, during acceleration, before the switch 26 can be opened by the controller 45 being moved to such position as to cause the opening of the switch 75, the current traversing the generator-field-magnet windings 44 must have risen to a value large enough to maintain the relay 32 in actuated position, else the actuating coil of the switch 26 will be maintained energized by this relay. Similarly, during deceleration, before the switch 17 can be opened by the controller 45, the maintaining circuit for its actuating coil must be opened at the relay 20; that is, the current traversing the motor-field-magnet windings 41 must be of such value as to maintain the relay 20 in open position. The function of the relays 20 and 32, which relays are sometimes termed "field-interlocking" relays, is thus to control the time of operation of the switches for controlling the excitation of the field-magnet windings of the motors and generators in accordance with the current traversing the field-magnet windings of the generators and the motors, respectively.

One very important reason for connecting the actuating coil of the relay 32 in the manner shown in Fig. 2 will now appear. Should the resistor 43 be suddenly short-circuited, the current in the discharge resistor 18, which is non-inductive, would suddenly rise to a very large value, decreasing later as the current in the field-magnet windings 44 increases. By means of the connections shown, the relay 32 is made more readily responsive to all the actual current conditions of the circuit.

When it is desired to stop the motors, the controller 45 is actuated toward the position *a*. The motors then operate as generators when the electromotive forces generated by them exceed the voltage of the generators. As the controller is actuated gradually to the position *a*, the motor-accelerating switches are closed in an order substantially inverse to that in which they opened, and the motor fields are strengthened to increase the voltage of the motors. The generator switches are opened to weaken the fields of the generators, the field-forcing switches 22 and 23, as is obvious, remaining open, and thus permit a correspondingly heavy current to traverse the main circuit, which constitutes a dynamic braking circuit for the motors. The coil 63 of the relay 61, which normally opposes the shunt coil 62, now assists the latter because the current traverses the main circuit in the opposite direction and the relay 61 is, accordingly, actuated to its upper position, the switch 36 mechanically connected to the relay 61 rendering the relay 56 ineffective to control the switch 12. The relay 59 is also, of course, rendered ineffective when the relay 61 occupies its upper position. The switch 12 will thus be maintained closed during the deceleration of the motors to maintain the field-weakening resistor 13 short-circuited. Not only that, but the excitation of the field-magnet windings 44 is further controlled by the switch 19, which is closed when the relay 61 occupies its upper position, to short-circuit a portion of the field-discharge resistor 18. This portion may be adjusted to suit the particular conditions, as desired. The short-circuiting of the resistor 13 and of a portion of the discharge resistor 18 serves to decrease the resistance of the local circuit comprising the field-magnet windings 44, the discharge resistor 18 and the field-weakening resistor 13. The rate of change of the current traversing this local circuit is thereby decreased and the regenerative current peaks are reduced to a corresponding degree. If desired, the relay 59, which operates as a fluttering relay, may be made to control the switches 24 and 25 during deceleration as well as during acceleration, and constitute a forcing in the building up of the motor fields, as in the control system forming the above-mentioned application by Lum.

When it is desired to operate the motors in the opposite direction, the controller is actuated toward the right, as viewed in Fig. 3. For a time, the relay 32 will be maintained open and the relay 20 closed. When the excitation of the field-magnet windings 44 is low enough to permit the relay 32 to be closed, the switch 26 will become closed. The switches 27 to 31 will then be successively closed as the controller 45 is actuated to its successive positions and, when the excitation of the field-magnet windings 41 is sufficiently high to cause the opening of the relay 20, the actuating coil of the switch 17 will be freed from the control of this relay. The switches 17, 16, 15 and 14 will then be opened in the order named. The relay 32 will then close, making it impossible to weaken again the excitation of the field-magnet winding 41 until the generator field-magnet windings 44 are once more strengthened to a value sufficient to cause the opening of the relay 32.

Upon the opening of the switch 14, the maintaining circuit for the actuating coil of the reversing switch 1 (as also of the reversing switch 3), will be opened by the switch 68 and not until the switch 1 has been opened will it be possible to energize the actuating coil of the switch 2, the circuit of this coil being controlled by the switch 51, which is mechanically connected to the switch 1. Reversing switches 2 and 4 will then close to reverse the direction of the exciting current through the generator-field-magnet windings 44 and thereby to reverse the direction of the electromotive force applied to the motor-armature windings. The current traversing the field-magnet winding 38 of the exciter E is also reversed. The reversing switches 6 and 8 operate, however, to reverse the direction of current through the motor-field-magnet windings 37. The motors operate in the reverse direction since the current through their armature windings is reversed while the direction of current through the motor-field windings remains the same. The operation is otherwise as described above in connection with the acceleration of the motors in the forward direction.

Upon the switch 42 becoming opened and the corresponding switch 78 closed for operation in the reverse direction, a circuit will be established which extends from the positive line conductor, through the mechanically connected switch 34, the switch 78, the switch 65, that is mechanically connected to the switch 1 (which switch 65, since the actuating coil of the switch 1 cannot become de-energized until the opening of the switch 68, is, at this time, closed) and the actuating coil of the switch 64, to the negative line conductor. The energization of the coil 64 causes the closing of the switch 85 and the opening of the switches 55. The opening of the switches 55 causes the opening of the circuits of the actuating coils of the switches 14 to 17, so that these switches 14 to 17 cannot be closed for operation in the reverse direction until the switch 1 has first opened to break the circuit of the coil 64 at 65 and until the switch 2 (and of course, also, the switch 4) has been closed to establish the circuits for operation in the reverse direction. The switches 14 to 17 may then be closed, as above described, to accelerate the generators, the switches 55 assuming their closed positions upon the coil 64 becoming de-energized.

The function of the switch 85 is to establish a holding circuit for the actuating coil of the switch 26, this holding circuit extending from the positive line conductor, through the mechanically connected switch 34, the switch 85 and the actuating coil of the switch 26, to the negative line conductor. Irrespective, therefore, of the position of the relay 32, the switch 26, and, through the switch mechanically connected thereto, the switch 27, and also the other switches 28 to 31, will be maintained closed by the circuit controlled by the switch 85 until the switch 1 has opened to cause the de-energization of the coil 64 at the switch 65. The provision of the switch 85 is important because it is perfectly possible for the relay 32 to occupy its illustrated, open position at a time when it is desired to reverse quickly, so that some additional means must be provided for controlling the actuating coil of the switch 26 at this time.

When the motors are operating at high speed, the switches 14 to 17 and the relay 20 are closed and the switches 26 to 31 and the relay 32 are open. If the master controller 45 were to be quickly actuated from the full-running position in one direction to the full-running position in the other, and if the switch 85 were omitted, the switches 26 to 31 would be momentarily closed and immediately reopened before the relay 20 would have an opportunity to open, for the switches 26 to 31 would not be maintained closed long enough to effect a sufficiently great increase in the excitation of the field-magnet windings 41. The switches 14 to 17 would thus be free to operate, regardless of the relay 20. A quick actuation of the controller 45 to effect reversal would therefore be inadvisable. The provision of the switch 85 avoids this difficulty, for it maintains the switches 26 to 31 closed until the motors have reversed and the generator fields have had an opportunity to build up in the opposite direction.

The function of the switches 55 and 85, therefore, is to make it possible to move the master controller 45, as rapidly as possible, from a position corresponding to high speed in the one direction to a position corresponding to high speed in the other direction, or from any position to any other position, without interfering with the sequence of operation of the switches; and the function of the relays 20 and 32 is to interlock the motor and generator fields in the manner above-described.

In connection with the function of the field interlocking relays 20 and 32, it should be noted that their response to current conditions is rendered more quick by reason of their actuating coils being connected in the local circuit comprising the field-magnet windings and the discharge resistors. This is because, when resistance is removed from the circuit of the field-magnet windings, the resulting current traversing the windings is at first far above that determined by Ohm's law, then falling to the lower and normal value as the field builds up to normal value. The effect of this abnormal value of the current is diminished by the placing of the actuating coils of the relays 20 and 32 in the manner described.

If, during the operation either of acceleration or of deceleration, the current traversing the main circuit rises to a very high value, the coil 35 will cause the tripping of a circuit-breaker 33, so as to prevent injury to the machines. Simultaneously with the opening of the circuit-breaker, the switch 34 will be opened to cause the opening of all the control circuits. Were it not for the switch 34, it would be possible, after the opening of the circuit breaker, for the operator, upon returning the controller 45 to the position $a$, to obtain a high degree of excitation of the motor, resulting of course, in high voltage upon the armature and this, in turn, would cause objectionable flashing. By this arrangement, furthermore, the operator is prevented from energizing the generator field until the circuit-breaker is closed, thereby precluding the danger of the operator leaving the master controller 45 in a running position after the circuit-breaker is opened, which might result in the burning out of the circuit breaker upon its being reclosed.

By means of the above-described improvements, it is feasible to operate a system comprising a motor and a generator quickly and by unskilled hands without danger of injuring the machinery and with a saving of much valuable time.

As I believe my invention to be broadly new, I desire that the appended claims be given a broad construction, except in so far as limitations may be specifically imposed therein.

I claim as my invention:

1. The combination with a dynamo-electric machine having a field magnet winding, of a discharge circuit for said winding comprising a resistor in series relation thereto and a resistor in parallel with said winding and said series-connected resistor, and means for controlling said resistor.

2. The combination with a dynamo-electric machine having a field-magnet winding, an accelerating resistor and a field-weakening resistor in series therewith and a discharge resistor in parallel relation to said winding and said field-weakening resistor, of means for controlling said discharge resistor and said field-weakening resistor.

3. The combination with a motor and a generator having armatures connected to each other in a main circuit, said generator having a field-magnet winding, an accelerating resistor and a field weakening resistor in series therewith and a discharge resistor in parallel relation to said field magnet-winding and said field-weakening resistor, of means for controlling said field-weakening resistor in accordance with the current traversing said main circuit, and means for controlling a portion of said discharge resistor in accordance with the current traversing said main circuit and the voltage of said main circuit.

4. The combination with a dynamo-electric machine having a field-magnet winding, an accelerating resistor and a field-weakening resistor in series therewith and a discharge resistor in parallel to said field-magnet winding and to said field-weakening resistor, of means for successively short-circuiting portions of said accelerating resistor to cause the acceleration of said machine, means for temporarily short-circuiting an additional portion of said resistor to force the field of said machine, and means for inserting said field-weakening resistor into circuit when the current traversing said machine exceeds a predetermined value.

5. The combination with a dynamo-electric machine having a resistor associated therewith and a switch for short-circuiting said resistor, said switch having an actuating coil, of a switch for normally closing the circuit of said coil during the acceleration of said machine, means for rendering said closing switch ineffective under predetermined conditions, and a switch for maintaining the circuit of said coil closed during the deceleration of said machine.

6. The combination with a generator and a motor in series-circuit relation of a switch for controlling the field excitation of said motor, and a switch controlled in accordance with the electrical conditions of said generator for controlling said first-named switch.

7. The combination with a pair of dynamo-electric machines, of a switch for controlling one of said machines, a switch for closing said controlling switch, and a switch controlled in accordance with the electrical conditions of said other machine for maintaining said controlling switch closed.

8. The combination with a pair of dynamo-electric machines in series circuit relation, of means for controlling the field strength of one of said machines, and means for determining the sequence of operation of controlling the field strengths of said machine, said means comprising means dependent upon the field strength of the other machine for controlling said first-named controlling means.

9. The combination with a pair of dynamo-electric machines, of means for varying the field-strengths of said machines in a predetermined order, said means comprising means responsive to the field strength of one of said machines for controlling the field strength of said other machine.

10. The combination with a pair of dynamo-electric machines having resistors associated therewith, of means for successively controlling said resistors during acceleration, means for controlling said resistors in reverse order during deceleration, and means controlled in accordance with the electrical conditions of said machines for determining the time interval between the successive control of said resistors.

11. The combination with a pair of dynamo-electric machines having field-magnet windings and resistors in circuit therewith, of means controlled by the current traversing each of said windings for controlling the resistor in circuit with said other winding.

12. The combination with a pair of dynamo-electric machines having field-magnet windings, of means for controlling the excitation of one of said windings, means for rendering said controlling means effective, and means controlled in accordance with the degree of excitation of said other winding for maintaining said controlling means effective.

13. The combination with a pair of dynamo-electric machines and a resistor associated with one of said machines, of a plurality of successively actuated switches for controlling said resistor, each having an actuating coil, a switch mechanically connected to a plurality of said switches for establishing a maintaining circuit for the coils of others of said switches, and a switch responsive to the electrical conditions of said other mechine for establishing a holding circuit for one of said coils, 14. The combination with a motor and a generator having field-magnet windings and resistors in circuit therewith, of means for first short-circuiting said generator resistor and then inserting said motor resistor, means for controlling the direction of operation of said generator, and means controlled by said direction-controlling means and in accordance with the degree of excitation of said generator winding for preventing the short-circuiting of said motor resistor.

15. The combination with a motor and a generator having field-magnet windings and resistors in circuit therewith, of means for first short-circuiting said generator resistor and then inserting said motor resistor, means for controlling the direction of operation of said generator, and means for preventing the short-circuting of said motor resistor and the reinserting into circuit of said generator resistor upon the reversal of said direction-controlling means until the direction of operation of said generator has been reversed.

16. The combination with a motor and a generator having armatures connected in series and control circuits for said motor and said generator, of means in circuit with said armatures for opening all of said control circuits under predetermined conditions.

In testimony whereof, I have hereunto subscribed my name this 26th day of Feb. 1919.

EDWIN S. LAMMERS, Jr.